(12) United States Patent
Snopko et al.

(10) Patent No.: US 8,942,887 B2
(45) Date of Patent: Jan. 27, 2015

(54) MACHINE, EXHAUST PARTICULATE FILTER SYSTEM, AND METHOD

(75) Inventors: Michael A. Snopko, Washington, IL (US); Anthony C. Rodman, Langtoft (GB); Rajesh Nair, Peoria, IL (US); Frederic Fugere, Chillicothe, IL (US); Andrew A. Knitt, Deer Creek, IL (US); Malshantha M. Kankanamge, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 867 days.

(21) Appl. No.: 12/969,749

(22) Filed: Dec. 16, 2010

(65) Prior Publication Data

US 2012/0158242 A1 Jun. 21, 2012

(51) Int. Cl.
*G06F 7/00* (2006.01)
*F01N 9/00* (2006.01)

(52) U.S. Cl.
CPC ........... *F01N 9/002* (2013.01); *F01N 2560/028* (2013.01); *F01N 2560/06* (2013.01); *F01N 2560/12* (2013.01); *Y02T 10/47* (2013.01)
USPC ......................................................... 701/36

(58) Field of Classification Search
CPC .............. F01N 9/002; F01N 2560/028; F01N 2560/12; F01N 2560/06; Y02T 10/47
USPC ................. 701/36; 123/70; 588/320; 60/285; 324/639, 640
See application file for complete search history.

(56) References Cited

U.S. PATENT DOCUMENTS

| | | | |
|---|---|---|---|
| 4,477,771 A | 10/1984 | Nagy et al. | |
| 5,157,340 A | 10/1992 | Walton et al. | |
| 5,177,444 A | 1/1993 | Cutmore | |
| 5,497,099 A | 3/1996 | Walton | |
| 6,240,722 B1 | 6/2001 | Busch et al. | |
| 7,157,919 B1 | 1/2007 | Walton | |
| 7,253,641 B2 | 8/2007 | Knitt et al. | |
| 7,260,930 B2 | 8/2007 | Decou et al. | |
| 7,322,182 B2 | 1/2008 | Ueno et al. | |
| 2007/0101705 A1 | 5/2007 | Knitt | |
| 2008/0018442 A1 | 1/2008 | Knitt | |
| 2008/0048681 A1 | 2/2008 | Birkhofer et al. | |
| 2008/0059093 A1 | 3/2008 | Bromberg et al. | |
| 2010/0101409 A1 | 4/2010 | Bromberg et al. | |
| 2010/0102828 A1 | 4/2010 | Bromberg et al. | |

FOREIGN PATENT DOCUMENTS

WO 2009/031600 3/2009

*Primary Examiner* — John Q Nguyen
*Assistant Examiner* — Jordan S Fei
(74) *Attorney, Agent, or Firm* — Baker Hostetler

(57) ABSTRACT

A machine includes an internal combustion engine, and an exhaust particulate filter system coupled therewith having an exhaust particulate filter for trapping particulates in exhaust from the internal combustion engine. A control system for the exhaust particulate filter includes a sensing mechanism such as an RF soot sensor and a data processor coupled with the sensing mechanism and configured to output a moisture compensation signal responsive to a pattern of inputs from the sensing mechanism indicative of moisture within the exhaust particulate filter, for controlling regeneration thereof.

8 Claims, 4 Drawing Sheets

MACHINE, EXHAUST PARTICULATE FILTER SYSTEM, AND METHOD

TECHNICAL FIELD

The present disclosure relates generally to exhaust particulate filters of the type used in connection with internal combustion engines, and relates more particularly to a moisture compensating regeneration control strategy for an exhaust particulate filter system.

BACKGROUND

A great many different types of aftertreatment systems have been used in connection with internal combustion engines for many years. In many instances, it is desirable to trap particulates in exhaust from internal combustion engines, and exhaust particulate filters or "traps" are widely used for this purpose. While many exhaust particulate filters are quite effective at trapping soot, eventually the quantity of trapped soot reaches a point at which continued operation of the engine becomes problematic or at least less efficient, or risks damaging the filter. "Regeneration" is a term generally used to describe the process of cleansing an exhaust particulate filter of trapped soot. A typical approach involves raising the temperature within the filter to a point sufficient to combust the trapped soot and turn it into less undesirable or more readily treated emissions.

A number of different regeneration techniques are well known and widely used. Among these are the use of catalysts resident in an exhaust particulate filter, borne in the engine fuel or supplied by other means to assist in combusting soot at relatively lower temperatures than what might otherwise be required. Other regeneration techniques rely upon injection of fuel into the exhaust gases, which is subsequently combusted upstream of, or upon entering the exhaust particulate filter, to increase the temperature therein. Still other techniques involve the use of electrically powered heaters and the like, or employ unconventional engine timing and/or fueling techniques. Regeneration technologies relying upon the use of catalysts tend to be quite expensive, whereas techniques employing electric heaters or specialized engine operation tend to siphon off energy from the engine, and fuel injection strategies directly consume fuel.

Regardless of the particular regeneration strategy used, it is desirable to avoid operating an engine with an inordinately packed filter, on the one hand, yet desirable to avoid overuse of energy and reactant-consuming strategies on the other. For these reasons, engineers are continually seeking techniques to more accurately detect an actual amount of trapped soot so that underuse and overuse of regeneration can be avoided.

SUMMARY OF THE DISCLOSURE

In one aspect, an exhaust particulate filter system for an internal combustion engine includes an exhaust particulate filter having a housing, and a filter medium positioned within the housing for trapping particulates in exhaust from the internal combustion engine. The system further includes a regeneration control system for the exhaust particulate filter, having a sensing mechanism and a data processor coupled with the sensing mechanism. The data processor is configured to output a moisture compensation signal responsive to a pattern of inputs from the sensing mechanism indicative of moisture within the exhaust particulate filter.

In another aspect, a method of operating an exhaust particulate filter system for an internal combustion engine includes receiving inputs from a sensing mechanism indicative of moisture within the exhaust particulate filter system, and outputting a moisture compensation signal responsive to the inputs. The method further includes commanding regeneration of the exhaust particulate filter system responsive to the moisture compensation signal.

In still another aspect, a machine includes a frame, and ground engaging propulsion elements coupled with the frame. The machine further includes an engine system coupled with the frame having an internal combustion engine, an exhaust particulate filter fluidly connected with the internal combustion engine, and a control system for the exhaust particulate filter. The control system includes a sensing mechanism and a data processor configured to receive inputs from the sensing mechanism indicative of moisture within the exhaust particulate filter. The data processor is further configured to output a moisture compensation signal for controlling regeneration of the exhaust particulate filter, responsive to the inputs.

DETAILED DESCRIPTION

Figure 1:
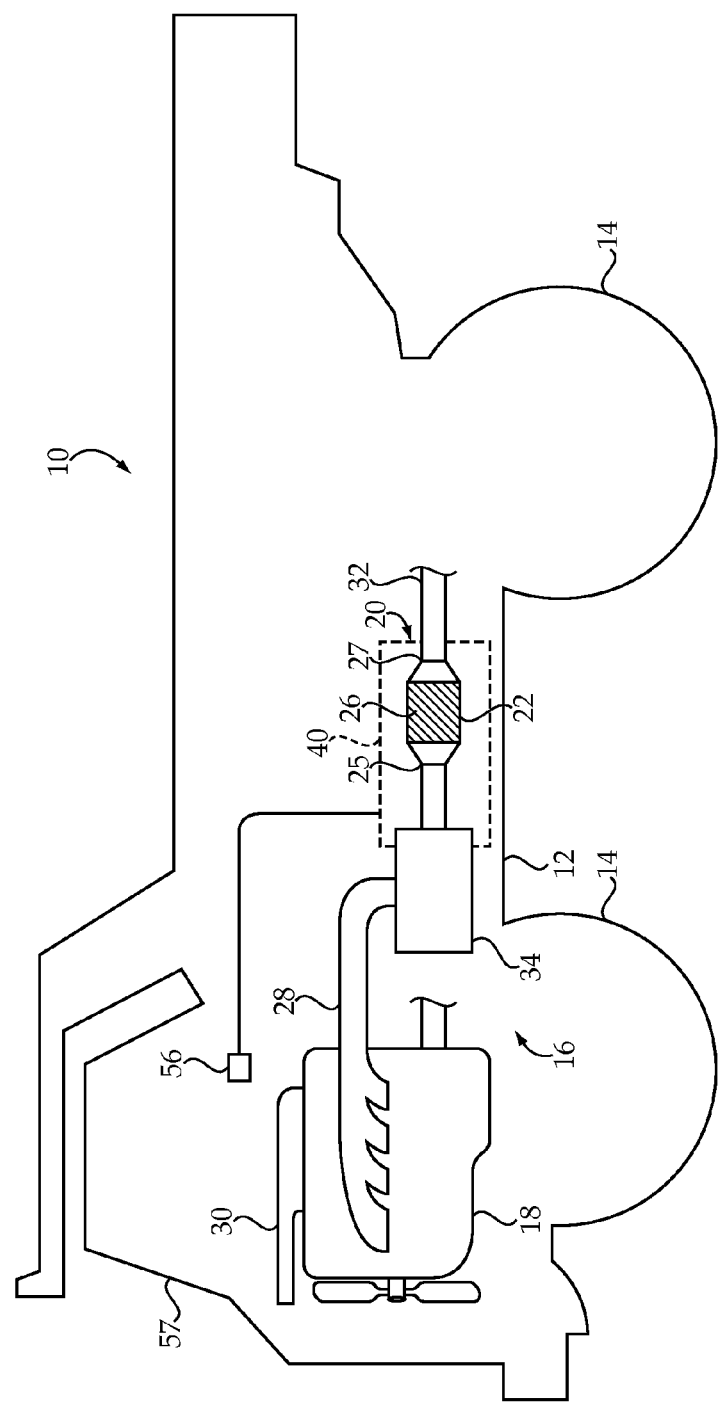
FIG. 1 is a side diagrammatic view of a machine according to one embodiment.

Referring to FIG. 1, there is shown a machine 10 according to one embodiment. Machine 10 is shown in the context of an off-highway truck having a frame 12, and ground engaging propulsion elements coupled with frame 12. In other embodiments, machine 10 might include a track-type machine having ground engaging tracks rather than propulsion wheels, or still another type of machine such as a motor grader, a backhoe, a wheel loader, a scraper, or any of a variety of other machine types. Machine 10 may be equipped with an engine system 16 coupled with frame 12 and including an internal combustion engine 18 such as a compression ignition diesel engine, and an exhaust particulate filter system 20 which includes an exhaust particulate filter 22 fluidly connected with engine 18. As will be further apparent from the following description, exhaust particulate filter system 20 may be uniquely configured to address issues relating to moisture carried in an exhaust gas stream from engine 18 to filter system 20, or introduced into system 20 through other phenomenon such as condensation from ambient air.

Filter 22 may include a canister or housing 24 having an exhaust inlet 25 fluidly connected with an exhaust conduit 28 coupled with engine 18 in a conventional manner, and an exhaust outlet 27 coupled with an outlet conduit 32, in turn connecting with an exhaust stack or tail pipe (not shown) in a conventional manner. A regeneration mechanism 34 may be positioned fluidly between engine 18 and filter 22 to enable regeneration of filter 22 in a manner and under circumstances further described herein. A filter medium 26 is positioned within housing 24, and configured for trapping particulates such as soot and ash in exhaust from engine 18. Filter system 20 may further include a regeneration control system 40 for filter 22, which includes a variety of components having features and functions further described herein, and also including a key switch 56 positioned in an operator cab 57 of machine 10, the significance of which will be apparent from the following description.

Figure 2:
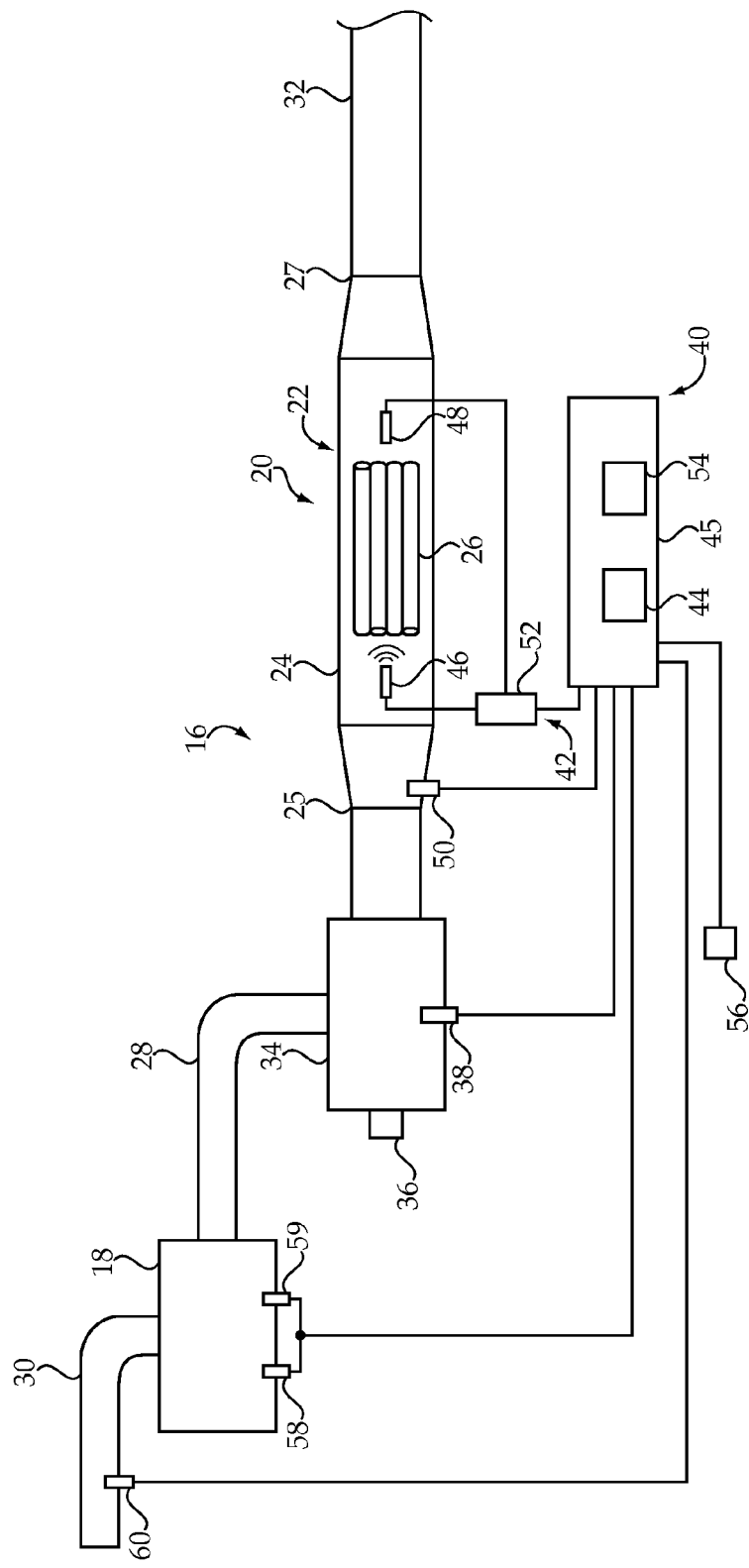
FIG. 2 is a side diagrammatic view of an engine system suitable for use with the machine of FIG. 1.

Referring also now to FIG. 2, there are shown certain components and features of engine system 16 in further detail. As noted above, regeneration mechanism 34 may be configured to regenerate filter 22, for example when a relative amount of trapped soot in filter 22 exceeds a desired level. Those skilled in the art will be familiar with the general phenomena of soot particles being trapped within a filter medium of an exhaust particulate filter. Over time, soot tends to accumulate to a point that filter efficacy tends to degrade, as well as elevating a back pressure on an associated internal combustion engine which can have undesired consequences. In the present disclosure, filter medium 26 may include any of a wide variety of different filter media types, such as a ceramic filter medium like cordierite, a metallic mesh filtration medium, or still another type of filter medium. Replaceable filter cartridges or a monolithic filter medium may be used without departing from the scope of the present disclosure. Further still, filter medium 26 might include catalyst materials, or catalyst might be actively supplied to assist in combustion of soot. In any event, in one embodiment regeneration mechanism 34 may include an air inlet 36 for supplying combustion air into a stream of exhaust gases passing between conduit 28 and filter 22. Regeneration mechanism 34 may also include a fuel delivery device such as a fuel nozzle 38 or other fuel delivery mechanism for supplying a combustion fuel such as liquid diesel distillate into the exhaust gases to combust with the combustion air, and thereby raise the temperature of gases passing to filter 22 to initiate and/or maintain combustion of soot trapped therein.

Filter system 20 may further include a regeneration control system 40 for filter 22, including a sensing mechanism 42 and a data processor 44 coupled with sensing mechanism 42 and configured to receive inputs from sensing mechanism 42. Data processor 44 may be part of an electronic control unit 45 which includes a filter control unit, but which might also comprise an engine control unit. In other words, electronic control unit 45 may be configured to monitor and control filter system 20 but might additionally be configured to monitor and control operating aspects of engine 18 as well as other components of system 16 and/or machine 10. A computer readable memory 54 may be coupled with data processor 44, and data processor 44 may be further configured to store filter soot loading data on computer readable memory 54 for reasons further described herein. Memory 54 may include any form of suitable memory such as a hard drive, flash memory or the like.

In one embodiment, sensing mechanism 42 may include a soot sensor having a computer 52 in communication with electronic control unit 45, and also including a transmitter 46 and a receiver 48 positioned within housing 24 and configured to transmit and receive, respectively, radio frequency ("RF") signals through filter medium 26. Each of RF transmitter 46 and RF receiver 48 may include an antennae such that they are capable of either transmitting or receiving RF signals passed through filter medium 26. Computer 52 may be configured to output signals to electronic control unit 45 which are indicative of an attenuation of RF signals transmitted through filter medium 26. Attenuation of the transmitted RF signals may be indicative of a relative soot loading state of filter 22, such that data processor 44 may command operation of regeneration mechanism 34 responsive to a soot loading state of filter 22 as indicated by an attenuation of the RF signals as well as other factors further described herein.

In one practical implementation strategy, the RF "signals" transmitted through filter 22 may include a series of discrete pulses transmitted via transmitter 46 and received via receiver 48. Each of the discrete pulses may include a different RF frequency such that a plurality of frequencies defining an RF frequency band are periodically or repetitively transmitted through filter medium 26 and received via receiver 48. One example protocol includes transmitting a one millisecond RF frequency pulse at a first frequency, followed by a second one millisecond pulse at a different frequency, followed by a third one millisecond pulse at yet another frequency, and so on, until a frequency band of about 200 megahertz has been transmitted and received. A difference between transmitted amplitude of each of the pulses and received amplitude of each of the pulses may be encoded in one or more outputs from computer 52 to data processor 44. Such outputs will thus be understood as indicative of signal attenuation of RF signals transmitted through filter medium 26. Data processor 44 may receive corresponding inputs from computer 52 and determine a relative soot loading state of filter 22. One manner in which relative soot loading state may be determined is by way of calculating a mean signal attenuation value for each of the frequencies in the described RF frequency band. General principles of how to determine a relationship between RF signal attenuation and relative soot loading state are known in the art for certain conditions, notably controlled conditions in a laboratory setting. By way of the teachings set forth herein, calculation of relative soot loading state of a filter such as filter 22 and control of filter regeneration under actual service conditions not typically encountered in a laboratory will be readily apparent.

Sensing mechanism 42 may further include a temperature sensor 50 such as a temperature sensor configured to sense an inlet temperature of filter 22 and output temperature data to data processor 44. Temperature within an exhaust particulate filter can affect the extent to which RF energy is attenuated when transmitted through a filter medium containing trapped soot. In general, the attenuation is negatively correlated with temperature, and thus data processor 44 may be configured to determine a relative soot loading state of filter 22 also in response to inputs from temperature sensor 50. Inputs received by data processor 44 from sensing mechanism 42, including both RF signal attenuation data and filter temperature data encoded by the inputs, may be stored via data processor 44 on computer readable memory 54. As alluded to above, the present disclosure may be applicable to determining soot loading in an exhaust particulate filter under conventional known conditions, as well as previously unrecognized conditions. One such previously unrecognized condition relates to determination of filter soot loading where moisture within an exhaust particulate filter system impacts an attenuation of RF energy transmitted through a particulate medium containing trapped soot.

To this end, data processor 44 is configured to output a moisture compensation signal responsive to a pattern of inputs from sensing mechanism 42 indicative of moisture within exhaust particulate filter 22. Water is itself an attenuator of RF energy. Accordingly, the presence of moisture within exhaust system 20, and in particular moisture which condenses on or within filter medium 26 can affect attenuation of RF signals transmitted between RF transmitter 46 and RF receiver 48, and can consequently affect the data encoded in signals outputted from computer 52 to data processor 44. This in turn can affect the accuracy of any determination of relative soot loading state of filter 22, and consequently affect the appropriateness of regeneration timing. Moisture within system 20 may have different sources. Those skilled in the art will be readily familiar with the generation of water vapor during operation of any conventional internal combustion engine, and the presence of water vapor in intake air from ambient. Thus, water in the engine exhaust itself may condense on or in filter medium 26. In addition, when engine system 16 is shut down, there may be fluid connections between filter 22 and ambient such that humid ambient air makes its way into filter 22 and moisture carried therein condenses. The present disclosure addresses the problems and potential problems associated with condensed water in or on soot trapped in filter medium 26 in alternative ways, which may be enabled in a single control strategy for soot monitoring and filter regeneration, but which might also be carried out by way of independent techniques.

As mentioned above, data processor 44 may be configured to output a moisture compensation signal responsive to inputs from sensing mechanism 42. In one embodiment, data processor 44 may be configured to compare stored filter soot loading data for a first time period prior to switching engine 18 off with stored filter soot loading data for a second time period after switching engine 18 on, and responsively output the moisture compensation signal. It has been discovered that data from a sensing mechanism such as mechanism 42 presumed to be indicative of or associated with a filter soot loading state can vary based on the presence of condensed moisture in or on filter medium 26. Thus, "filter soot loading data" as discussed herein should be understood to include such data as is collected for the purpose of determining filter soot loading state and/or timing regeneration, even if errors or inaccuracies in the data must be compensated, or additional processing steps undertaken, before an accurate assessment of filter soot loading state and/or time for filter regeneration is obtained. As mentioned above, the present disclosure includes one or more strategies for addressing the contribution of condensed moisture, once the presence of the effect of moisture on the filter soot loading data is recognized.

In a first strategy, data processor 44 may be configured to command a "mini" regeneration of filter 22 to elevate the temperature therein sufficiently to drive off condensed water, in response to detecting the presence of moisture, directly or indirectly, in filter 20. The mini regeneration may include a regeneration which is not necessarily intended to burn off all of the trapped soot in or on filter medium 26, but only elevate the temperature within filter 22 sufficiently to vaporize the condensed moisture and exhaust it from filter system 20. After executing a mini regeneration, the impact or potential impact of moisture on soot sensing accuracy is negated, and conventional soot sensing as well as associated timing and commanding of regular regeneration may commence. The mini regeneration control strategy may take place shortly after turning engine system 16 on and while machine 10 is parked, such as responsive to an input from key switch 56. To ensure that a mini regeneration or even the control strategy therefor is not executed solely on the basis of detecting that engine system 16 is electrically turned on, an engine running sensor 58 in communication with data processor 44 may be employed to confirm that engine 18 is actually operating.

As an alternative to or in parallel with determining whether a mini regeneration is advantageous, data processor 44 may further be configured to process data from sensing mechanism 42 in a way which compensates for the presence of moisture within filter 22. This strategy may include storing filter soot loading data on memory 54 responsive to switching engine 18 off, storing additional filter soot loading data on memory 54 responsive to switching engine 18 on, and calculating or otherwise determining a value based on a difference between the respective data sets. The determined value enables taking into account the contribution of moisture within filter 22 on the RF signal attenuation data from sensing mechanism 42. Each of the two different general approaches is discussed further below in connection with the example control process of FIG. 4.

It will be recalled that the above techniques, a mini regeneration or a modified data processing technique, may be enabled via data from sensing mechanism 42. Alternative strategies are contemplated, however, whereby data processor 44 can determine, estimate, or infer that moisture has condensed or is likely to condense within filter system 20 and consequently impact soot loading determinations and regeneration control. In addition to or alternatively to determining the presence or likely presence of condensed moisture based on data from soot monitoring hardware, the present disclosure contemplates determining the presence or likely presence of moisture based on data gathered from other parts of engine system 16. To this end, control system 40 may include a humidity sensor 60 or the like which is positioned within intake conduit 30 and outputs signals to data processor 44 responsive to a humidity of intake air being supplied to engine system 16. While sensor 60 is shown exposed to a flow of gases fluidly between an inlet to intake conduit 30, and an exhaust gas inlet 25 of filter 22, one or more additional sensors might be placed elsewhere in engine system 16 to similarly provide data which gives a general picture of whether there is or likely will be moisture within filter system 20 which needs to be compensated for. In this vein, control system 40 may further include an engine fueling sensor 59 coupled with engine 18 which, in cooperation with inputs from sensor 60 and possibly other sources of data in engine system 16, can output signals to data processor 44 enabling the detection of moisture or the detection of conditions likely to lead to condensed moisture within filter system 20.

Industrial Applicability

Figure 3:
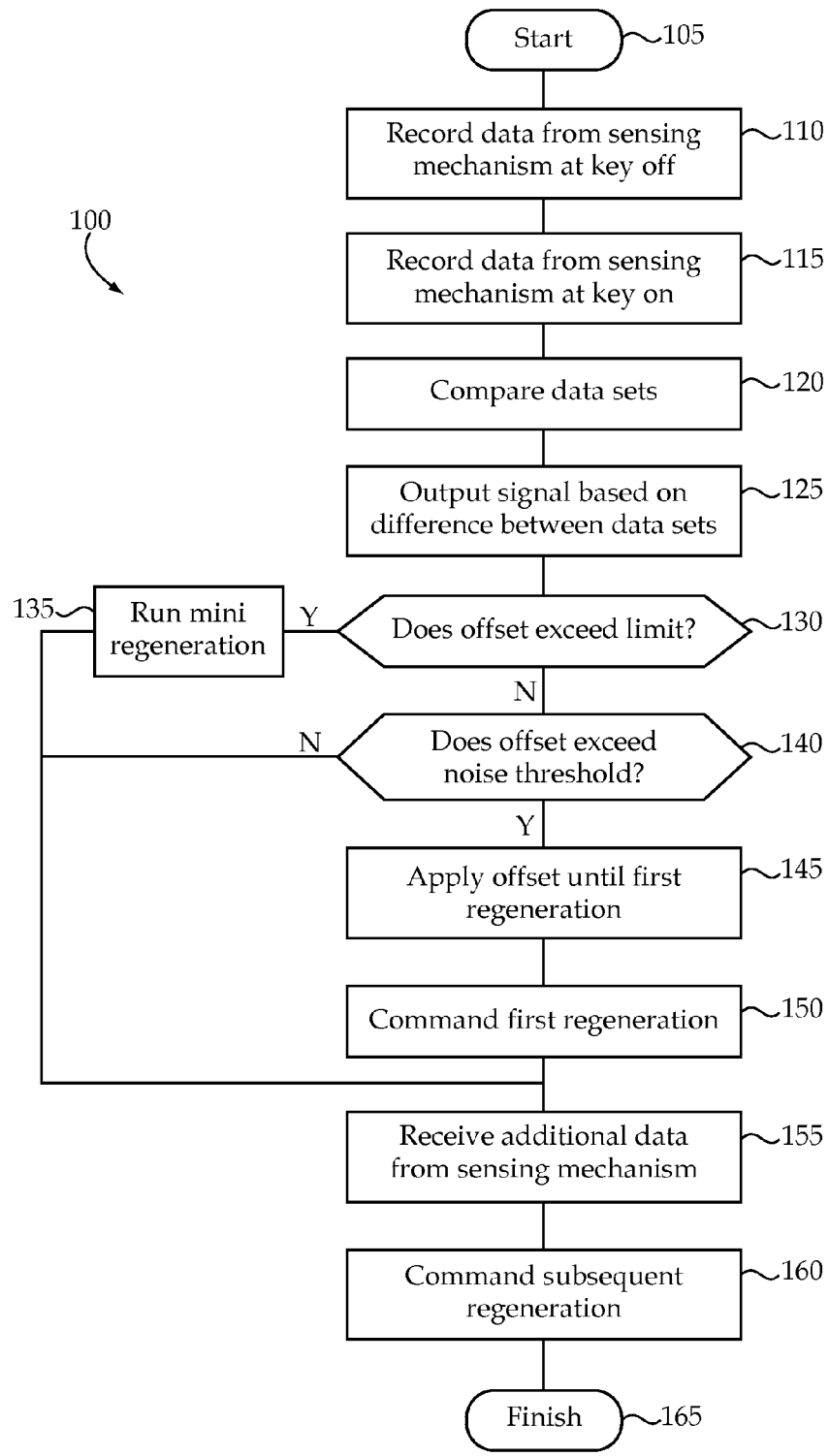
FIG. 3 is a flowchart illustrating an example control process according to one embodiment.

Referring also now to FIG. 3, there is shown an example control process by way of a flowchart 100. The process of flowchart 100 may start at step 105, and may then proceed to step 110 to record data from sensing mechanism 42 at key off. Additional data such as inputs from engine running sensor 58 may be used to determine that engine 18 is actually being shut down. From step 110, the process may proceed to step 115 to record data from sensing mechanism 42 at key on, similarly indicated by inputs from key switch sensor 56 and an additional sensor such as sensor 58. In each of steps 110 and 115, data processor 44 may store filter soot loading data as described herein on computer readable memory 54 responsive to the inputs from sensor 56.

From step 115, the process may proceed to step 120 to compare the respective data sets. Switching engine 18 off may occur under first ambient conditions such as relatively warmer conditions, whereas switching engine 18 on may occur under second ambient conditions such as relatively colder ambient conditions. As a result of the difference in ambient temperature, moisture may condense from gases resident within filter system 20. One example of where this phenomenon might occur is parking machine 10 overnight, where engine system 16 cools and moisture condenses from gases within filter system 20 onto components of filter system 20, as well as soot trapped in filter medium 26. The cooling soot may absorb some of the condensed moisture, which is reflected in the changed RF signal attenuation when engine system 16 is turned back on. Even where moisture absorbed by the soot evaporates or is driven off upon re-starting engine system 16, the physical state of the soot cake may have changed in some instances such that conventional soot monitoring will lead to inaccuracies. Thus, at key off, data from sensing mechanism 42 may indicate a first soot loading state. At key on, data from sensing mechanism 42 may indicate a second, higher soot loading state due to the contribution of condensed water or a changed physical state of the soot cake on the attenuation of the RF signals being used to detect soot, rather than any actual change in soot amount. Accordingly, without a compensation strategy, data processor 44 may not accurately "know" how much soot is trapped within filter medium 26, and would consequently risk mis-timing regeneration, wasting fuel. From step 120, the process may proceed to step 125 wherein data processor 44 outputs a signal based on a difference between the data sets. The outputted signal may include the moisture compensation signal discussed above. And may include an arithmetic difference between determined soot amounts indicated by the data sets, a difference between mean signal attenuation values, or some other value. From step 125, the process may proceed to step 130 wherein data processor 44 may query whether a difference or "offset" between the data sets which is encoded by the moisture compensation signal exceeds a predefined limit.

If at step 130 the offset exceeds a predefined limit, the process may proceed to step 135 to run a mini regeneration such as by commanding a mini regeneration cycle with data processor 44 to activate regeneration mechanism 34. Another way to understand the procedure at step 130 is that data processor 44 is determining whether the offset is large enough that condensed moisture should be driven off, and no attempt to compensate for moisture in the control strategy should be undertaken. Stated still another way, at step 130 data processor 44 may be determining whether an offset between the data sets satisfies condensation removal criteria. The predefined limit with which the offset is compared may be determined empirically, such as by way of tests with varying amounts of condensed moisture within a particulate filter, and determining a test value associated with an amount of condensed moisture that renders compensating for the moisture in soot sensing or regeneration timing impractical. If, at step 130, the answer is no, the process may proceed to step 140 where data processor 44 may query whether the offset exceeds a noise threshold. If no, it may be determined that the offset is likely to be the result of signal noise or otherwise so small that no extra moisture compensation steps need be taken. If yes, the process may proceed to step 145 to apply the offset until a first regeneration. In other words, at step 145 data from sensing mechanism 42 may be adjusted by the offset to give a more accurate determination of the actual soot loading state of filter 20 than what would likely be possible without using the offset.

From step 145, the process may proceed to step 150 at which data processor 44 may command a first regeneration. Between steps 145 and 150, control system 40 may thus be monitoring soot loading of filter 22 until such time as the relative soot loading state of filter 22 is deemed appropriate for commencing a regeneration cycle with regeneration mechanism 34. This may include receiving data from sensing mechanism 42, determining a mean attenuation value as described above, and then determining what relative soot loading state corresponds to the mean attenuation value by using the offset, and then timing filter regeneration appropriately. The present disclosure should not be understood to require any particular connection between relative soot loading state and the timing of regeneration, however, in one practical implementation strategy regeneration may be commanded when a relative soot loading state of about 6 grams per liter of filter volume has been reached. From step 150, following the first regeneration, the process may proceed to step 155 where data processor 44 receives additional data from sensing mechanism 42. From step 155, the process may proceed to step 160 to command a subsequent regeneration or second regeneration which is based on filter soot loading state determined independently of the offset. In other words, the regeneration commanded at step 160 may be a regular regeneration commanded in response to determining a filter soot loading state of filter 22 which does not account for moisture, and does not need to. From step 160, the process may finish at step 165.

Figure 4:
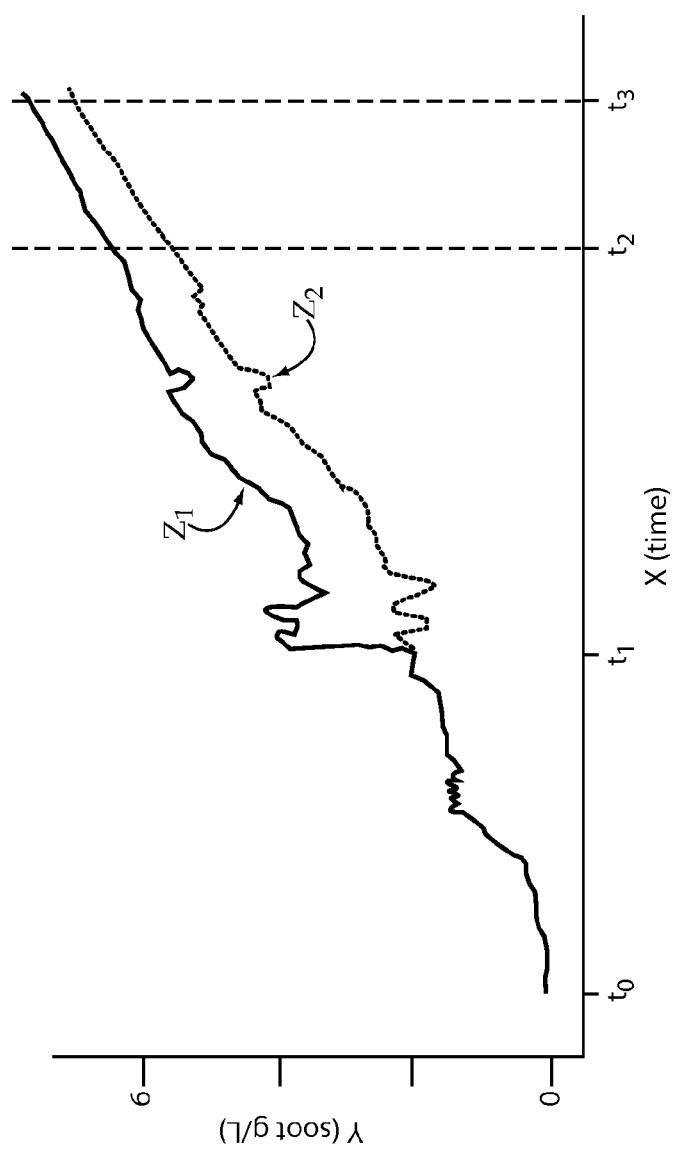
FIG. 4 is a graph relating filter soot loading to time according to two different soot calculation strategies.

Turning now to FIG. 4, there is shown a graph illustrating a determined relative soot loading state of an exhaust particulate filter between about 0 grams per liter and about 6 grams per liter on the Y-axis. The relative soot loading state is shown in comparison with time, including a plurality of time periods $T_0$-$T_3$ shown on the X-axis. Two curves $Z_1$ and $Z_2$ are also shown in the graph of FIG. 4. Curve $Z_1$ may be understood to represent an approximate soot loading state of an exhaust particulate filter which might be determined, albeit inaccurately, without the benefit of the teachings set forth herein. At approximately $T_1$, a jump in apparent soot loading state in curve $Z_1$ is evident. This jump in apparent soot loading state is representative of what might be seen if soot loading were calculated without compensating for the contribution of condensed moisture within an exhaust particulate filter system. For instance, an internal combustion engine including an exhaust particulate filter as described herein might be turned off just prior to time $T_1$, allowed to cool down, and then turned back on. Without compensating for moisture which condenses between the time the engine is turned off and when it is turned on, the condensed water may act as an attenuator and skew the results creating the appearance of a relatively greater soot loading state than that which actually exists. In contrast, curve $Z_2$ illustrates how soot loading may be calculated according to the present disclosure where moisture is compensated for. It may be noted that no jump in apparent soot loading is evident at time $T_1$.

One consequence of inaccurate soot loading determinations which will be well understood by those of skill in the art relates to the appropriateness of timing filter regeneration. If soot detection is insufficiently accurate, it is common for systems to be regenerated more often than is actually necessary to provide some leeway erring on the side of too much regeneration rather than too little. Regeneration, whether by way of specific engine operating strategies, electric heaters, fuel injection into exhaust, or generally any other strategy, often carries an efficiency or cost penalty. In other words, each time an exhaust particulate filter is regenerated, energy or reactant are consumed. Although catalyzed exhaust particulate filters may have efficiency advantages in some applications, they tend to have other downsides such as cost. Where regeneration takes place more frequently than optimal, energy tends to be wasted. In the example of FIG. 4, where determining soot loading according to a strategy which does not compensate for moisture, curve $Z_1$ would indicate that regeneration should occur at about time $T_2$. Using a technique according to the present disclosure, curve $Z_2$ more accurately indicates when a regeneration should actually occur, at a later time $T_3$, demonstrating an efficiency advantage over conventional systems.

The present description is for illustrative purposes only, and should not be construed to narrow the breadth of the present disclosure in any way. Thus, those skilled in the art will appreciate that various modification might be made to the presently disclosed embodiments without departing from the full and fair scope and spirit of the present disclosure. Other aspects, features and advantages will be apparent upon an examination of the attached drawings and appended claims.

What is claimed is:

1. An exhaust particulate filter system for an internal combustion engine comprising:
   an exhaust particulate filter including a housing, and a filter medium positioned within the housing for trapping particulates in exhaust from the internal combustion engine; and
   a regeneration control system for the exhaust particulate filter, including a sensing mechanism and a data processor coupled with the sensing mechanism, the data processor being configured to output a moisture compensation signal responsive to a pattern of inputs from the sensing mechanism indicative of moisture within the exhaust particulate filter;
   wherein the sensing mechanism includes an RF transmitter, an RF receiver, and a temperature sensor, coupled with the exhaust particulate filter;
   wherein the regeneration control system further includes a computer readable memory coupled with the data processor, and the data processor is further configured to store filter soot loading data which includes RF signal attenuation data and filter temperature data, encoded by the inputs, on the computer readable memory; and
   wherein the data processor is further configured to compare stored filter soot loading data for a first time period prior to switching the internal combustion engine off with stored filter soot loading data for a second time period after switching the internal combustion engine on, and responsively output the moisture compensation signal.

2. The system of claim 1 wherein the data processor is further configured to output the moisture compensation signal encoding an offset based on a difference between the stored filter soot loading data for the first and second time periods, and further configured to command regeneration of the exhaust particulate filter system responsive to the offset.

3. The system of claim 2 wherein the data processor is further configured to command a mini regeneration at a first time, and to command a regular regeneration at a later time, if the offset satisfies condensation removal criteria.

4. The system of claim 2 wherein:
   the data processor is configured to determine a filter soot loading state based on the offset value in a first soot loading cycle, and to command a first regeneration responsive to the filter soot loading state determined based on the offset; and
   the data processor is further configured to determine a filter soot loading state independently of the offset value in a subsequent soot loading cycle, and to command a subsequent regeneration responsive to the filter soot loading state determined independently of the offset.

5. A method of operating an exhaust particulate filter system for an internal combustion engine comprising the steps of:
   receiving inputs from a sensing mechanism indicative of moisture within the exhaust particulate filter system;
   outputting a moisture compensation signal responsive to the inputs; and
   commanding regeneration of the exhaust particulate filter system responsive to the moisture compensation signal;
   wherein the step of outputting further includes outputting a moisture compensation signal which encodes an offset;
   wherein the step of commanding further includes commanding regeneration at a time based on a filter soot loading state which is determined based on the offset;
   wherein the step of commanding further includes commanding regeneration if the moisture compensation signal satisfies condensation removal criteria;
   wherein the step of receiving further includes receiving inputs from the sensing mechanism for a first time period prior to switching the internal combustion off under first ambient conditions, and receiving inputs from the sensing mechanism for a second time period after switching the internal combustion engine on under second ambient conditions;
   wherein the step of receiving further includes receiving inputs from a sensing mechanism having an RF transmitter, an RF receiver and a temperature sensor;
   wherein the step of receiving further includes receiving inputs indicative of an attenuation of RF signals transmitted through the exhaust particulate filter in the first time period and an attenuation of RF signals transmitted through the exhaust particulate filter in the second time period, and the method further including a step of determining a mean value for the RF signals in the first time period and a second mean value for the RF signals in the second time period;
   the method further comprising a step of comparing the mean values, and outputting the moisture compensation signal responsive to a difference between the mean values.

6. A machine comprising:
   a frame;
   ground engaging propulsion elements coupled with the frame; and
   an engine system coupled with the frame and including an internal combustion engine, an exhaust particulate filter fluidly connected with the internal combustion engine, and a control system for the exhaust particulate filter having a sensing mechanism and a data processor;
   the data processor being configured to receive inputs from the sensing mechanism indicative of moisture within the exhaust particulate filter, and further configured to output a moisture compensation signal for controlling regeneration of the exhaust particulate filter, responsive to the inputs;
   wherein the sensing mechanism includes a soot sensor;
   the machine further comprising a computer readable memory, wherein the data processor is configured to store filter soot loading data received from the sensing mechanism on the computer readable memory, and further configured to compare stored filter soot loading data for a first time period prior to switching the engine system off with filter soot loading data for a second time period after switching the engine system on, and responsively output the moisture compensation signal.

7. The machine of claim 6 further comprising an engine key switch having an on position and an off position, and wherein the data processor is further configured to store the filter soot loading data for the first time period responsive to switching the engine key switch to the off position, and to store the filter soot loading data for the second time period responsive to switching the engine key switch to the on position.

8. The machine of claim 6 wherein the internal combustion engine includes a combustion air inlet, and the exhaust particulate filter includes an exhaust gas inlet, and wherein the sensing mechanism includes at least one sensor exposed to a flow of gases fluidly between the combustion air inlet and the exhaust gas inlet.

* * * * *

UNITED STATES PATENT AND TRADEMARK OFFICE
CERTIFICATE OF CORRECTION

| | |
|---|---|
| PATENT NO. | : 8,942,887 B2 |
| APPLICATION NO. | : 12/969749 |
| DATED | : January 27, 2015 |
| INVENTOR(S) | : Snopko et al. |

Page 1 of 1

It is certified that error appears in the above-identified patent and that said Letters Patent is hereby corrected as shown below:

In the specification

Column 6, line 35, delete "Industrial Applicability" and insert -- INDUSTRIAL APPLICABILITY --.

Signed and Sealed this
Seventeenth Day of November, 2015

Michelle K. Lee
*Director of the United States Patent and Trademark Office*